Patented May 25, 1954

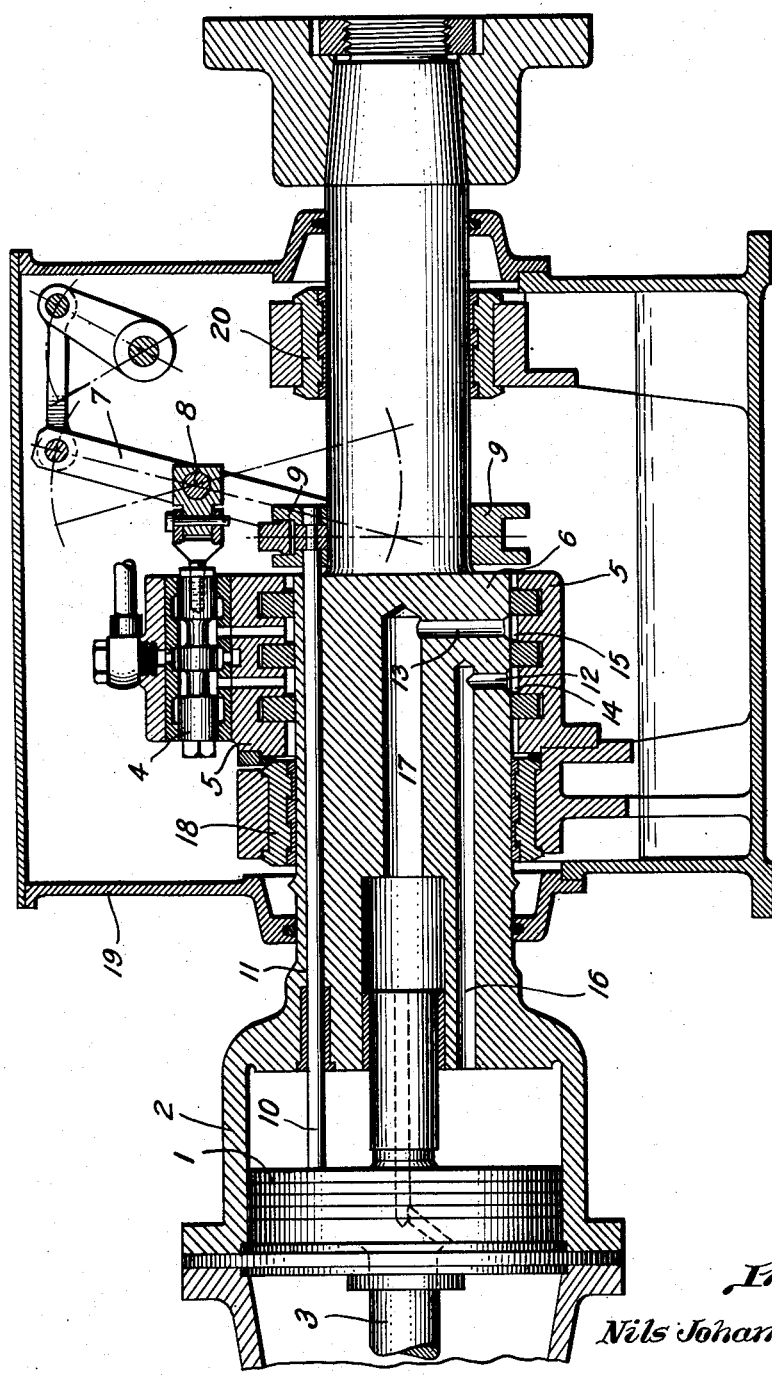

2,679,233

UNITED STATES PATENT OFFICE 2,679,233

SHAFT-HOUSED SERVOMOTOR OF THE FOLLOW-UP TYPE

Nils Johannes Liaaen, Alesund, Norway

Application December 19, 1949, Serial No. 133,764

2 Claims. (Cl. 121—41)

The present invention relates to pitch control mechanisms for propellers, pumps or turbines with turnable blades and with servomotor for turning of the same placed in an enlargement of the shaft, and in which a setting or resetting rod or rods for the servomotor slide is carried through an axial eccentric bore or bores in the shaft to a setting and resetting sleeve on the shaft. The radial bores or slits in the shaft necessary for conveying the pressure oil to and from the servomotor cause, as well known, a considerable weakening of the shaft so that the diameter of the same where such bores or slits exist must be considerably increased beyond what would otherwise be necessary for transmission of the power.

Subject matter of the invention is an arrangement avoiding the necessity of a special increase of the diameter of the shaft on the portion of the same where the said radial bores for conveying the pressure oil to and from the servomotor are disposed.

According to the invention this is obtained by arranging the inlet and outlet ring for the pressure oil for the servomotor, and consequently the radial bores for the oil on a portion of the shaft where the axial bore or bores for the setting and resetting rod or rods for the servomotor slide are disposed. These axial bores necessitate an enlargement of the shaft beyond what would otherwise be necessary for transmission of the power, and the shaft will already for this reason on the said portion be sufficiently increased to give compensation for the weakening due to the radial bores.

According to the invention a bearing for the shaft may also be arranged on a portion of the same where the bore or bores for the resetting rod or rods for the servomotor slide are disposed. The bearing may be provided with a packing and be arranged in one end wall of an oiltight casing, in the other end wall of which another bearing, likewise provided with packing, may be provided. Hereby any loss of oil is avoided and further the advantages obtained that the servomotor and the servomotor slide with its setting gear as well as the inlet and outlet ring for the oil for the servomotor conveniently may be mounted and adjusted in the workshop, and the section of the shaft with the said parts in place be mounted on board as a unit.

The drawing illustrates in axial section an example of an embodiment of a mechanism according to the invention, in which the servomotor slide is arranged outside of the shaft, respectively outside of the inlet and outlet ring for the pressure oil.

In the drawing, 1 is the servomotor piston which in the embodiment shown is arranged in an enlargement 2 of the shaft and is connected with the control rod 3 for the propeller blades. The servomotor slide 4 is mounted on the inlet and outlet ring 5 for the pressure oil for the servomotor. The slide is controlled by means of the double-armed lever 7 which is pivoted on the pin 8 connected with the slide, and the lower end of which in the usual way is connected with the sleeve 9, slideable on the shaft. This sleeve is also connected with the servomotor piston 1 through the resetting rod 10 arranged in an axial bore 11 in an enlarged portion 6 of the shaft.

According to the invention the ring 5 is arranged on the enlarged portion 6 of the shaft, so that the radial bores 12 and 13 for conveying the pressure oil to and from the servomotor also are situated in the same portion of the shaft which is increased in view of the axial bore or bores. A special enlargement of the shaft, which would otherwise be necessary in view of the radial bores, is therefore avoided.

The radial bores 12, 13 open in the ring shaped channels 14 and 15 in the ring 5 and are continued in the axial bores 16 and 17 respectively leading to opposite sides of the servomotor piston.

According to the invention a bearing 18 provided with a packing is also arranged on the portion of the shaft where the rod 10 for the servomotor slide is arranged. The bearing 18 may be disposed in one end of an oiltight casing 19 in which the servomotor slide with its control gear and the inlet and outlet ring for the oil to the servomotor are arranged and through the other end wall of which the shaft may be carried in a bearing 20 likewise provided with packing.

What I claim is:

1. In combination with the power-transmitting shaft of a controllable pitch propeller, a hydraulic servo-motor for controlling the pitch of said propeller, comprising a cylinder formed as a hollow portion of said shaft, a piston in the said cylinder and a rod connected to the said piston and extending through a central axial hollow in the said shaft for controlling the pitch of the said propeller, radial and axial bores in the said shaft for conveying pressure fluid to the said cylinder on opposite sides of the said piston, an inlet and outlet ring for the pressure fluid on the said shaft with fluid passages therein communicating with the said radial bores in the said shaft, a valve controlling the flow of the pressure fluid to and from the servo-motor cylinder, a sleeve slidable on said shaft and operatively connected to the said control valve and at least one rod slidable in an eccentric axial bore in the said shaft connecting said sleeve with the servo-motor piston, the last-said eccentric bore being located near the circumference of a portion of the said shaft the diameter of which is so enlarged relatively to the diameter of the portion of the shaft immediately forward of the first said portion, that the said connecting rod between the servo-motor piston and the sleeve may pass freely along the outside of said smaller portion of the shaft directly to the said sleeve slidable on this portion, the said radial bores for conveying pressure fluid to and from the servo-motor cylinder and the said inlet and outlet ring for the pressure fluid being arranged in and on the said enlarged portion of the said shaft.

2. The device of claim 1, including a bearing for said shaft provided on the same longitudinal section thereof as that containing said control valve operating rod.

References Cited in the file of this patent

UNITED STATES PATENTS

| Number | Name | Date |
|---|---|---|
| 1,656,149 | Hopkins | Jan. 10, 1928 |
| 2,244,770 | Englesson | June 10, 1941 |
| 2,513,546 | Atteslander | July 4, 1950 |
| 2,536,565 | Ostergren | Jan. 2, 1951 |

FOREIGN PATENTS

| Number | Country | Date |
|---|---|---|
| 875,980 | France | July 13, 1942 |